(12) United States Patent
Bui et al.

(10) Patent No.: US 11,913,811 B2
(45) Date of Patent: Feb. 27, 2024

(54) ENHANCED METER MANAGEMENT SOLUTION

(71) Applicant: COGNIZANT TECHNOLOGY SOLUTIONS U.S. CORPORATION, College Station, TX (US)

(72) Inventors: Christopher Bui, Los Angeles, CA (US); Alon Raskin, Houston, TX (US); Jagathguru Chandrasekharan, Houston, TX (US); William Chad Edens, Mcminnville, TN (US)

(73) Assignee: COGNIZANT TECHNOLOGY SOLUTIONS U.S. CORPORATION, College Station, TX (US)

( * ) Notice: Subject to any disclaimer, the term of this patent is extended or adjusted under 35 U.S.C. 154(b) by 0 days.

(21) Appl. No.: 17/877,619

(22) Filed: Jul. 29, 2022

(65) Prior Publication Data
US 2022/0364883 A1    Nov. 17, 2022

Related U.S. Application Data

(63) Continuation of application No. 16/844,958, filed on Apr. 9, 2020, now Pat. No. 11,460,321.

(60) Provisional application No. 62/832,310, filed on Apr. 11, 2019.

(51) Int. Cl.
| | |
|---|---|
| *G01D 4/00* | (2006.01) |
| *G06F 16/25* | (2019.01) |
| *H04Q 9/02* | (2006.01) |
| *H04Q 9/00* | (2006.01) |
| *G06Q 50/06* | (2012.01) |

(52) U.S. Cl.
CPC ............. *G01D 4/004* (2013.01); *G01D 4/008* (2013.01); *G06F 16/258* (2019.01); *G06Q 50/06* (2013.01); *H04Q 9/02* (2013.01); *H04Q 2209/60* (2013.01)

(58) Field of Classification Search
None
See application file for complete search history.

(56) References Cited

U.S. PATENT DOCUMENTS

| | | | |
|---|---|---|---|
| 11,460,321 B2* | 10/2022 | Bui ...................... | G01D 4/004 |
| 2005/0119930 A1 | 6/2005 | Simon | |
| 2012/0232915 A1* | 9/2012 | Bromberger .......... | G01F 15/063 705/1.1 |
| 2015/0097697 A1* | 4/2015 | Laval ..................... | H04L 69/03 340/870.02 |
| 2019/0260204 A1* | 8/2019 | Koval .................... | G06N 3/126 |

* cited by examiner

*Primary Examiner* — Curtis A Kuntz
*Assistant Examiner* — Jerold B Murphy
(74) *Attorney, Agent, or Firm* — CANTOR COLBURN LLP

(57) ABSTRACT

A method includes receiving, from a first head end system (HES), a first raw file including a first set of events in a first HES specific format, and modifying the first set of events in the first raw file by a first HES adapter to create a first unified formatted file. The first unified formatted file is in a unified format, and the first HES adapter is connected to the first HES. The method further include transforming, by a core HES adapter, the first unified formatted file to a first data management formatted file according to a data management format, and consuming the first data management formatted file.

20 Claims, 15 Drawing Sheets

ENHANCED METER MANAGEMENT SOLUTION

CROSS-REFERENCE TO RELATED APPLICATIONS

This application is a continuation of, and thereby claims benefit under 35 U.S.C. § 120 to U.S. patent application Ser. No. 16/844,958. U.S. patent application Ser. No. 16/844,958 claims the benefit under 35 U.S.C. § 119(e) to U.S. Provisional Patent Application Ser. No. 62/832,310, filed on Apr. 11, 2019. U.S. patent application Ser. No. 16/844,958 and U.S. Provisional Patent Application Ser. No. 62/832,310 are incorporated herein by reference herein in their entirety, including all exhibits.

BACKGROUND

Utility meters located at physical structures, such as households and businesses, monitor and control the usage of a particular utility at the physical structure. For example, water meters monitor and control the flow of water to a particular structure, while gas meters monitor and control the flow of natural gas to a physical structure. The control may be through installed valves at the meter control the allowed flow of the utility through the meter. Smart meters are utility meters that are capable of remote management and control. For example, smart meters may be controlled and reads obtained through a communication network.

Traditionally, the orchestration of a meter management solution from the systems perspective has involved three solution components: a head end system ("HES") that communicates directly with the meters and performs data collection activities, the meter data management system ("MDM" or "MDMS") that cleanses, stores, and publishes the metered data to subscribing systems, and a customer information system.

SUMMARY

In general, in one aspect, one or more embodiments relate to a method. The method includes receiving, from a first head end system (HES), a first raw file including a first set of events in a first HES specific format, and modifying the first set of events in the first raw file by a first HES adapter to create a first unified formatted file. The first unified formatted file is in a unified format, and the first HES adapter is connected to the first HES. The method further include transforming, by a core HES adapter, the first unified formatted file to a first data management formatted file according to a data management format, and consuming the first data management formatted file.

In general, in one aspect, one or more embodiments relate to a system including a database for storing a first data management formatted file, and a computer processor comprising instructions for causing the computer processor to perform operations. The operations includes receiving, from a first head end system (HES), a first raw file including a first set of events in a first HES specific format, and modifying the first set of events in the first raw file by a first HES adapter to create a first unified formatted file. The first unified formatted file is in a unified format, and the first HES adapter is connected to the first HES. The operations further include transforming, by a core HES adapter, the first unified formatted file to a first data management formatted file according to a data management format, and consuming the first data management formatted file.

In general, in one aspect, one or more embodiments relate to a non-transitory computer readable medium. The non-transitory computer readable medium performs operations includes receiving, from a first head end system (HES), a first raw file including a first set of events in a first HES specific format, and modifying the first set of events in the first raw file by a first HES adapter to create a first unified formatted file. The first unified formatted file is in a unified format, and the first HES adapter is connected to the first HES. The operations further include transforming, by a core HES adapter, the first unified formatted file to a first data management formatted file according to a data management format, and consuming the first data management formatted file.

Other aspects of the invention will be apparent from the following description and the appended claims.

DETAILED DESCRIPTION

Specific embodiments of the invention will now be described in detail with reference to the accompanying figures.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a two-tier approach to a meter management solution. The two-tier approach includes a head end system (HES) with a corresponding HES adapter, and a core HES adapter. The core HES adapter is connected to a meter data management application that does the cleaning storage of meter data along with the operations of a customer information system.

Thus, one or more embodiments transform the meter management to a two-tier approach.

Figure 1:
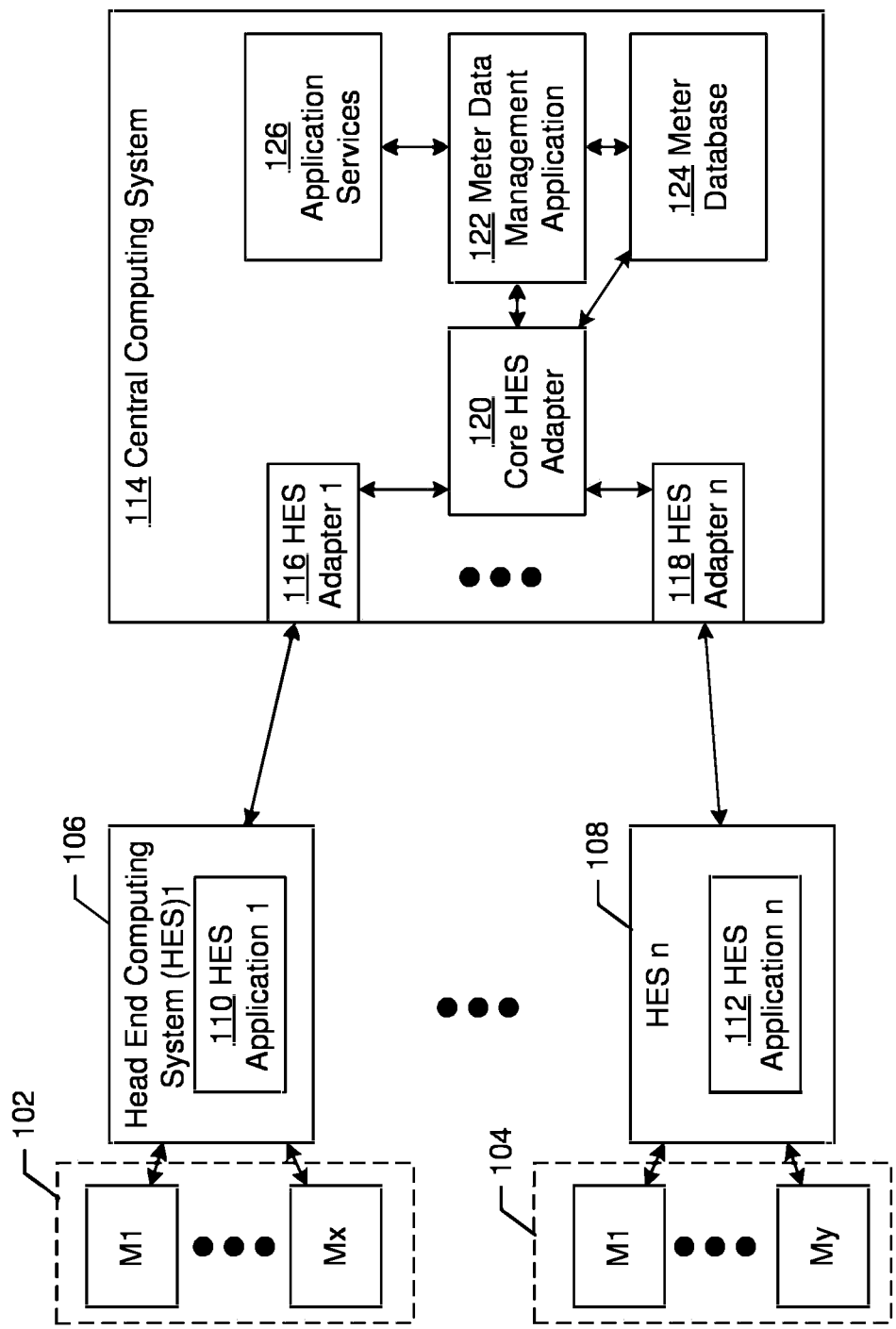
FIG. 1 shows a system diagram in accordance with one or more embodiments.

FIG. 1 shows a diagram of a system in accordance with one or more embodiments. As shown in FIG. 1, the system includes meters (e.g., M1 . . . MX (102), M1 . . . My (104)) communicatively connected to head end computing systems (106, 108), or head end systems. Each meter may be a utility meter installed at a physical location that has the utility being monitored. The connection between the HES and the meter may be through a communication network.

The HES (106, 108) are head end solutions that connect the centralized system of the central computing system (114). The HES (106, 108) receive data from the deployed meters. The HES (106, 108) include HES applications (110, 112), which are software applications having instructions to perform the functionality of the HES (106, 108).

HES (106, 108) are connected to a central computing system (114) via an HES adapter (116, 118). The HES adapter (116, 118) may be specific to a particular company providing an HES (106, 108) and/or meter and may provide data in different data formats. Thus, through the HES adapters (116, 118), the central computing system (114) may connect to any type of HES (106, 108). Although FIG. 1 shows the HES adapters (116, 118) as located on the central computing system (114), the HES adapters (116, 118) may be located on the HES (106, 108). The HES adapters (116, 118) do specific transformations and formatting for different head end solutions to transform the data into a unified format. The unified format is a format that is the same across all of the HES (106, 108).

The HES adapter (116, 118) is connected to and communicates with a core HES adapter (120). Specifically, the core HES adapter (120) transforms the unified format to the data management format. The data management format is the storage format of the meter database (124). Specifically, the data management format is the format of the meter database (124). In other words, the meter database (124) is the relational database or set of tables that stores the meter data and customer data.

The meter data management application (122) is a centralized application that is configured to add new meters and meter information to inventory, receive and validate meter readings, create and reports and invoices, and perform customer management. The meter data management application (122) is built upon a set of application services (126). The set of application services (126) are underlying services that may be called by the meter data management application (122).

FIGS. 2A-7B show various flow charts and timing diagrams. While the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2A:
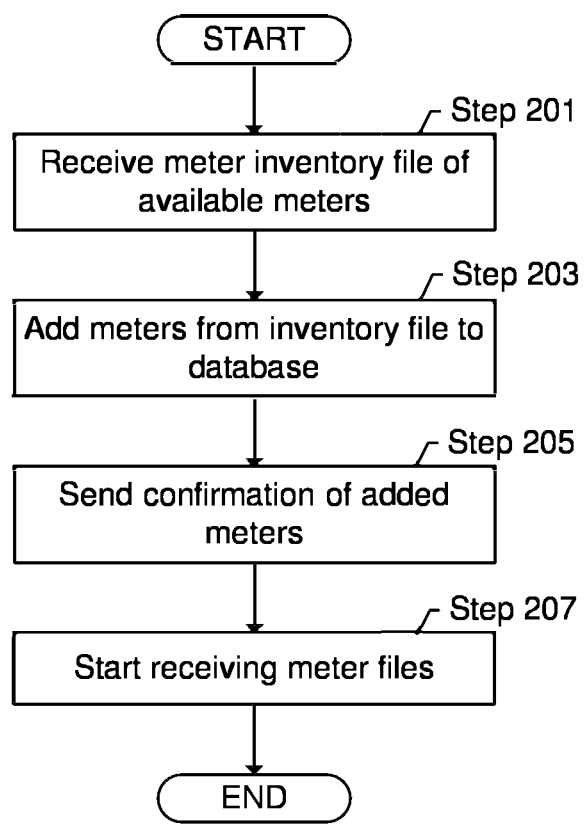
FIG. 2A, FIG. 2B, FIG. 3A, FIG. 3B, FIG. 4A, FIG. 4B, and FIG. 4C show flow diagrams in accordance with one or more embodiments.

FIG. 2A show an example flowchart for adding meters to an inventory in accordance with one or more embodiments.

In Step 201, a meter inventory file of available meters is received. The system receives an inventory file listing information about the meters, such as version number, type, identification information, and other information about the meters. The inventory file may be received from the HES and transmitted via the adapters to the meter data management application.

In Step 203, meters are added from the inventory file to the database. The meter data management application stores the information about the meters in the meter database. In Step 205, confirmation of added meters is sent. For example, the system may send confirmation to the HES. Prior to or after sending confirmation, the meters are physically installed at the respective locations. Further, the locations may be transmitted to the meter database. The meters may be physically associated with customers and In Step 207, the system starts receiving meter files. Specifically, the system receives meter read files with a set of events.

Figure 2B:
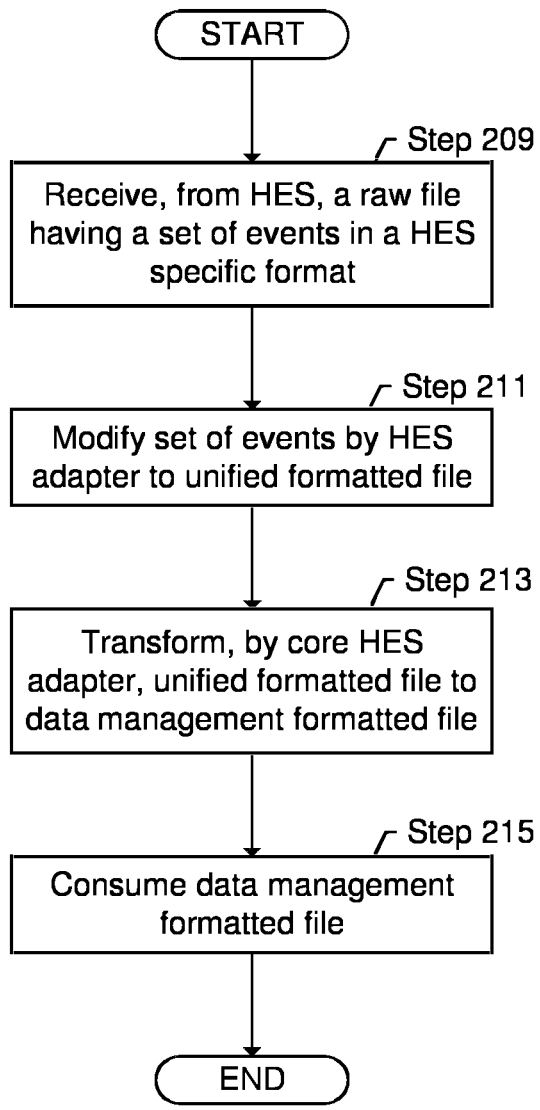

FIG. 2B shows a flowchart for receiving a set of events in accordance with one or more embodiments. In Step 209, a raw file having a set of events in HES specific format is received from HES. Events may be a meter reads, status events or other events from the meters. One or more HES receive the events from the respective meters. A possibility exists that some of the meters are not operating correctly and have missing or faulty reads. Meters connected to different HES may have varying propriety data formats (raw format). Thus, the events are received in raw format.

In Step 211, the set of events are modified by the HES adapter to a unified formatted file. The HES adapter parses and extracts pieces of information from the raw file to create the unified formatted file.

In Step 213, the core HES adapter transforms the unified formatted file to a data management formatted file. Specifically, the core HES adapter extracts the information from the unified formatted file to store the data in the meter database. In Step 215, the data management formatted file is consumed. The meter data management application processes the data from the meter database. Processing the events in the meter database is described in the subsequent Figures.

Figure 3A:
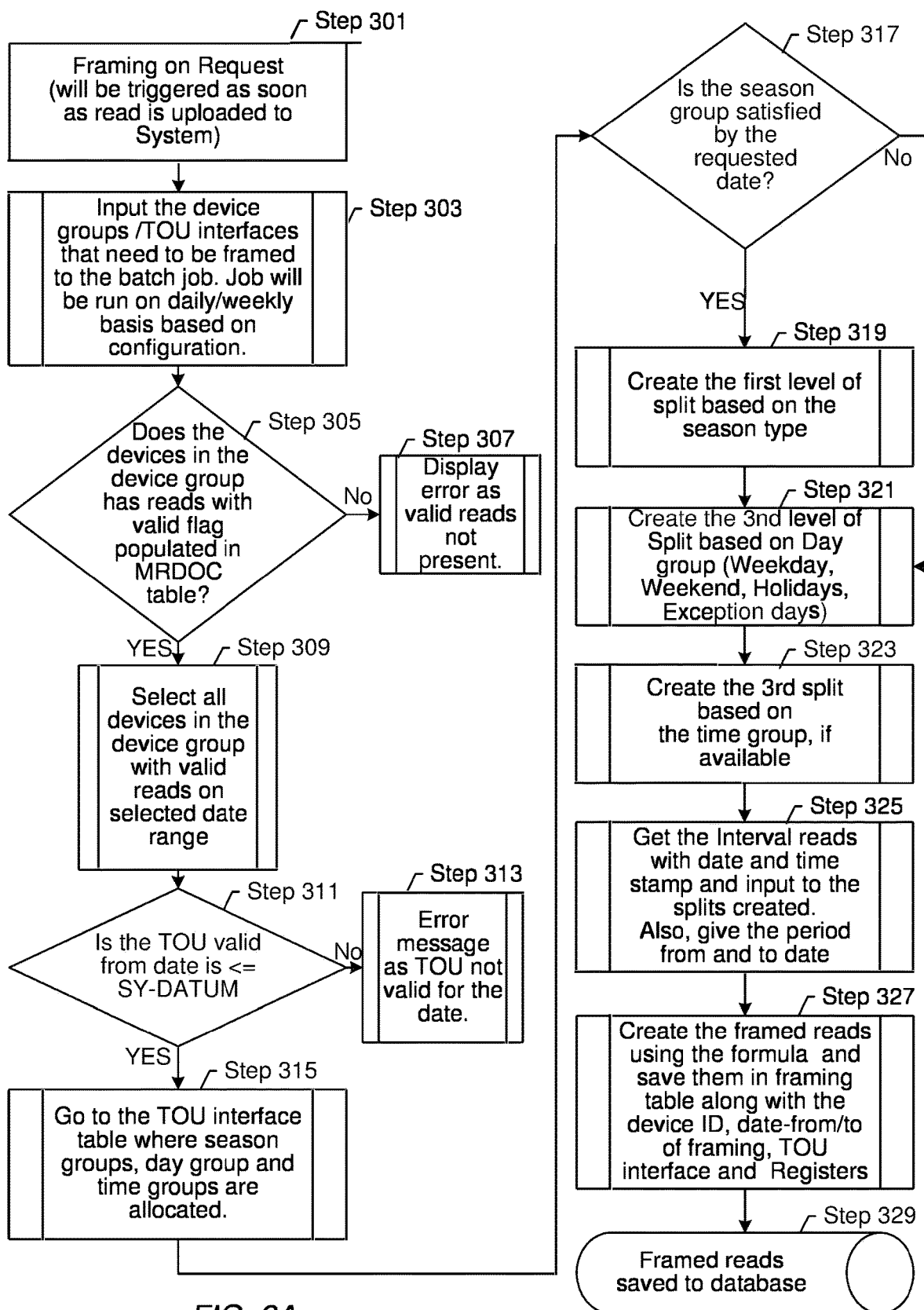

FIG. 3A is directed to framing Framing refers to the process where interval reads are aggregated into various buckets for the purpose of billing or providing further information to downstream processes such as bill presentment, analytics, customer alerts/alarms and more.

Consider a standard residential customer who has a 15-minute interval meter installed. Every day 96 reads are collected by the smart meter and sent back to the utility for billing. At some utilities, the residential customers incur charges at a specific rate for 'peak' usage and a different (usually lower) rate for off-peak usage. In order to bill the customer, the 96 interval reads must be 'framed' into two buckets, peak and off-peak. Once that has occurred the total peak and off-peak usage is fed into the billing process.

Another scenario which relies upon Framing is bill presentment. The interval data is framed as it is received, in order to provide on-going view of a particular customer's usage. This usage can then be used viewed in the customer facing portal which is provided by the Utility. The usage data can notify a customer that based on their current usage consumption, they will be facing a high bill, etc.

Turning to FIG. 3, in Step 301, the framing on request is performed. The framing is performed when a meter read is uploaded to the system. In Step 303, the device groups/TOU interfaces that need to be framed are input to a batch job. The job may be run daily/weekly based on configuration.

In Step 305, a determination is made whether the devices (i.e., meters) in the device group has reads with a valid flag populated in a table of the meter database. If not, the error is displayed as valid reads not present in Step 307.

In Step 309, if yes, devices in the device group with valid reads on the selected date range are selected. In Step 311, a determination is made whether the TOU is valid from the date in the read to less than or equal to the system data. In Step 313, if invalid, an error message is presented as the TOU is invalid for the date.

If valid, in Step 315, the TOU interface table is tracked where season groups, time groups, and day groups are allocated. In Step 317, a determination is made whether the season group is satisfied by the requested date. In Step 319, if the season group is satisfied, the first level split based on the season type is created.

Regardless of whether the season group is satisfied, a third level of split is created based on the day group in Step 321. A third level of split is created based on the time group, if available, in Step 323. In Step 325, interval reads with date and time stamps are obtained. Further, inputs to the split are created. Also, the period from and to date are provided.

In Step 327, the framed reads are created using the formula. The framed reads are saved in a framing table along with the device ID, date-from/to of framing, TOU interface and registers. In Step 329, the framed reads are saved to the meter database.

Figure 3B:
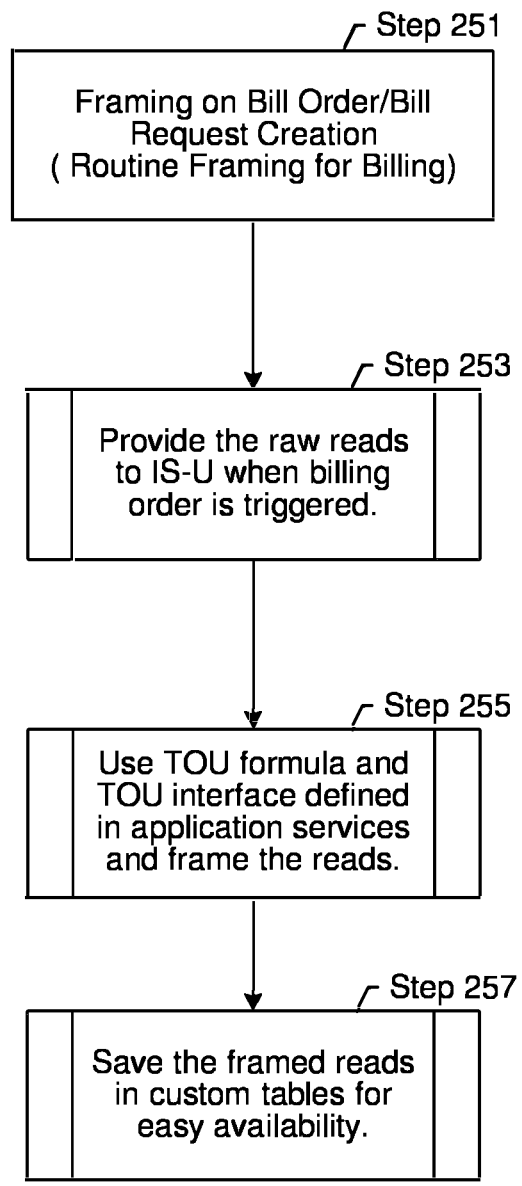

Turning to FIG. 3B, a framing on bill order/bill request creation is performed in Step 251. The framing request is performed for billing. The raw reads are provided to the IS-U when the billing order is triggered in Step 253. In Step 255, the TOU formula is used along with the TOU interface defined in the application services. The meter reads are framed. In Step 257, the framed reads are saved in custom tables for easy availability.

Framing may be described as follows. Once interval and register reads are received by advanced metering infrastructure (AMI) (i.e., the meter management application), the meter reads are validated, estimated (if required) and finally uploaded to billing, an application service. Each 'end' process (e.g., Billing and Framing) analyzes the data and decide whether the device can bill/frame based on the type and quantity of validation errors.

For example, if a device has a single interval read that has failed tolerance check, the reads may be framed as a single interval that has failed a tolerance check. However, from a billing perspective, not be acceptable to bill this customer with a single invalid read. Therefore, the billing process evaluates the validation 'failures' and either proceed or skip the billing process for that device.

The first step of the System framing process is to determine which interval reads should be 'framed'. The system framing process will determine which interval reads are ready for framing and check if any of the reads have validation errors. If the reads do have any validation failures, then a BADI will be called which will allow the customer to determine whether the framing will proceed. If the BADI returns an exception the framing for these interval reads (System MR Doc) will not proceed and a log entry will be created. If the BADI is not implemented, then framing will not proceed.

Framing procedure are assigned at the following level, Register/Channel level, Meter Program, Rate Category, and Device Group. The system will first check the register/channel for a framing procedure value. If none is found, the system will proceed to check the meter program, rate category and allocated device group(s). If no framing procedure is found on any of those entities, then no framing will occur. The first framing procedure found will be used and no further checks will occur.

The framing steps essentially maps to a time of use (TOU) structure. The TOU structures do not necessarily map into a billing rate but they could. Once the TOU structure has determined the process will iterate through each interval in the day profile and determine which TOU should be applied to the interval.

When the user clicks on break down, each day that is shown in the view (in this example, 30 days) will be shown with the framing that is available on the back end for that register. The bar chart will be broken down in to buckets where each bucket is represented by a unique color (any color). The legend should be shown on the right-hand side. If the user clicks the break down button again it is removed and the user just sees the green, orange and red bars (success, edited and error).

The GUI will provide the ability for a user to execute any TOU formula on a selected date range. This will allow the user to run a 'what if' scenarios on the currently selected date range. When the user clicks on this 'what if' button, the user selects a TOU formula to apply. The system will then run this scenario on the appropriate date range and show the result on the selected bar chat.

The total aggregation of the selected days for the selected TOU formula. The GUI will display the total for weekday peak, week end off peak, etc. for all the dates displayed. Furthermore, the user can click on any of the day and in the popup, view the numbers of the break down (weekday peak, weekday off-peak, etc.) in the appropriate units (kWh, etc.).

Figure 4A:
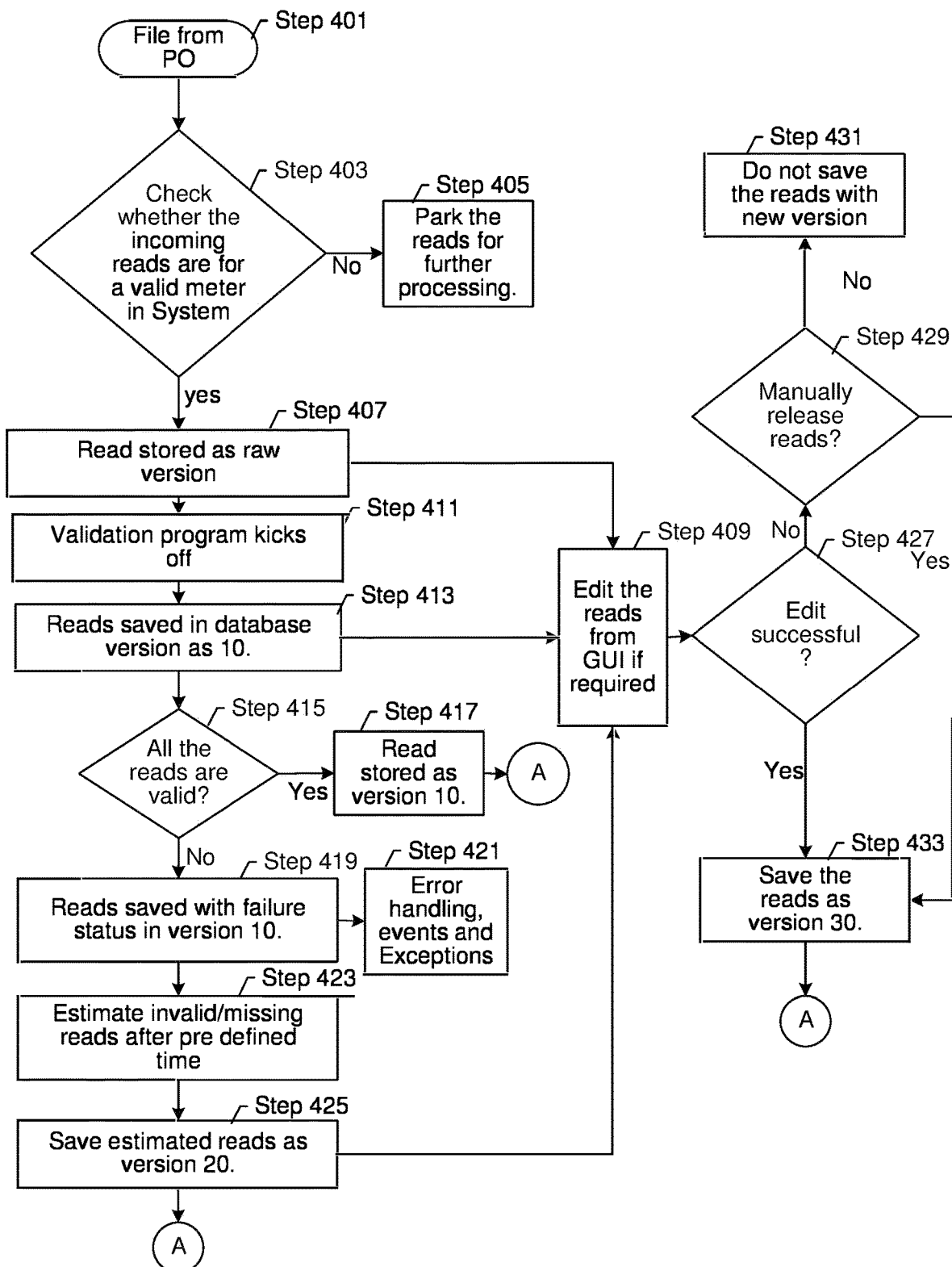
Figure 4B:
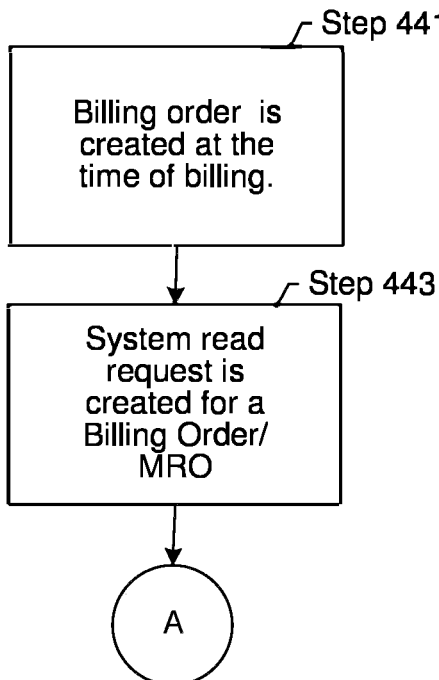
Figure 4C:
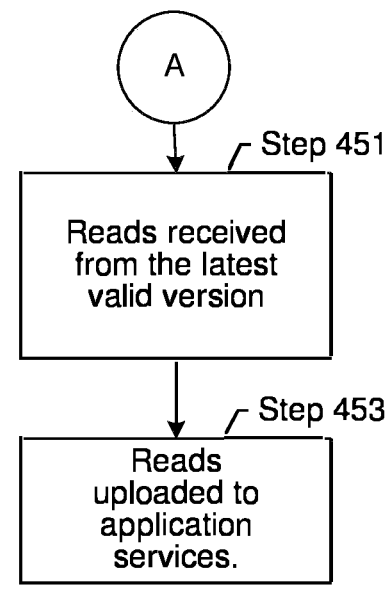

FIGS. 4A, 4B, and 4C show flowcharts for receiving, validating and processing meter reads. The circled A in the Figures is an off-page reference. In Step 401, a meter read file is received from a PO. A determination is made in Step 403 whether the incoming reads are for a valid meter in the system. In particular, a determination is made whether any meter reads exist that are for meters not saved in the meter database. For any invalid reads, the meter reads are parked in the database for further processing in Step 405. The process may end with respect to such reads.

For the meter reads that are associated with valid meters, the reads are stored as a raw version in Step 407. At various stages, the reads may be concurrently edited using a graphical user interface (GUI), if required, in Step 409.

Concurrently, a validation programs starts in Step 411. As such the reads are validated. Example validation techniques are described in reference to FIGS. 6A, 6B, and 6C. The reads are saved in the database as version 10 in Step 413. If all reads are determined as valid in Step 415, the reads are stored as version 10 in Step 417. The process proceeds in Step 4C. If invalid reads exist, the reads are saved with a failure status in version 10 in Step 419. Error handling, event, and exceptions are handled at Step 421. Concurrently, at Step 423, the invalid/missing reads are estimated after a pre-defined time. The estimated reads are saved as version 20 in Step 425. Reads may be edited using the user interface at Step 409 and/or the flow may proceed to FIG. 4C. If the reads are edited, the flow may proceed to Step 427 to determine whether the editing is successful. If editing is successful, the flow proceeds to Step 433 to save the reads as version 30. If editing is not successful, a determination is made whether to manually release reads in Step 429. If the determination is made not to manually release reads, the reads are not saved with a new version in Step 431.

FIG. 4B shows a flowchart for creating a billing report. A billing order is created at the time of billing in Step 441. In Step 443, a system read request is created for a billing order/MRO. The flow then proceeds to FIG. 4C. At FIG. 4C in Step 451, reads are received from the latest valid version. The reads are uploaded to the application services in Step 453.

Figure 5A:
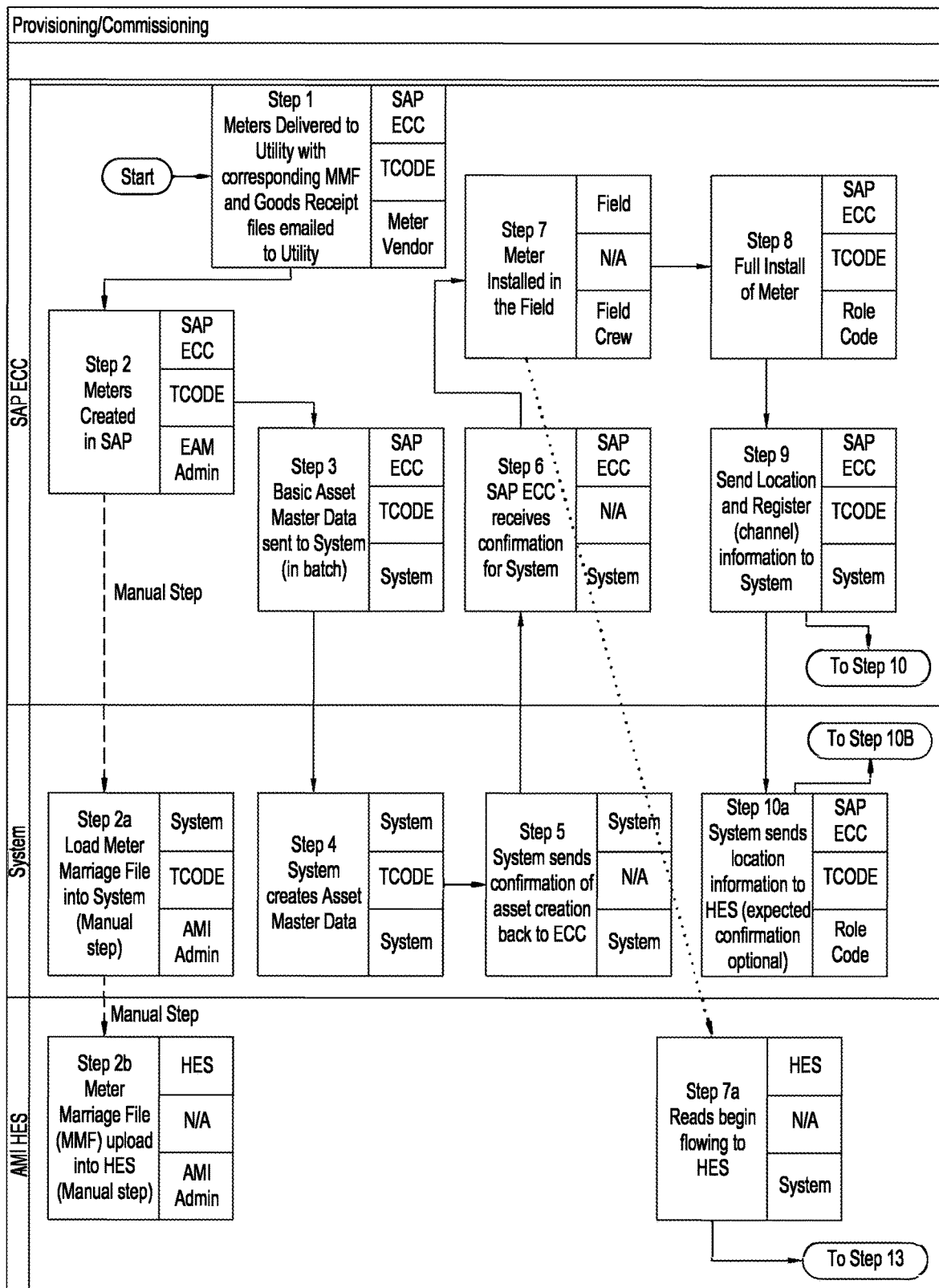
FIG. 5A and FIG. 5B shows a diagram of an install process in accordance with one or more embodiments.
Figure 5B:
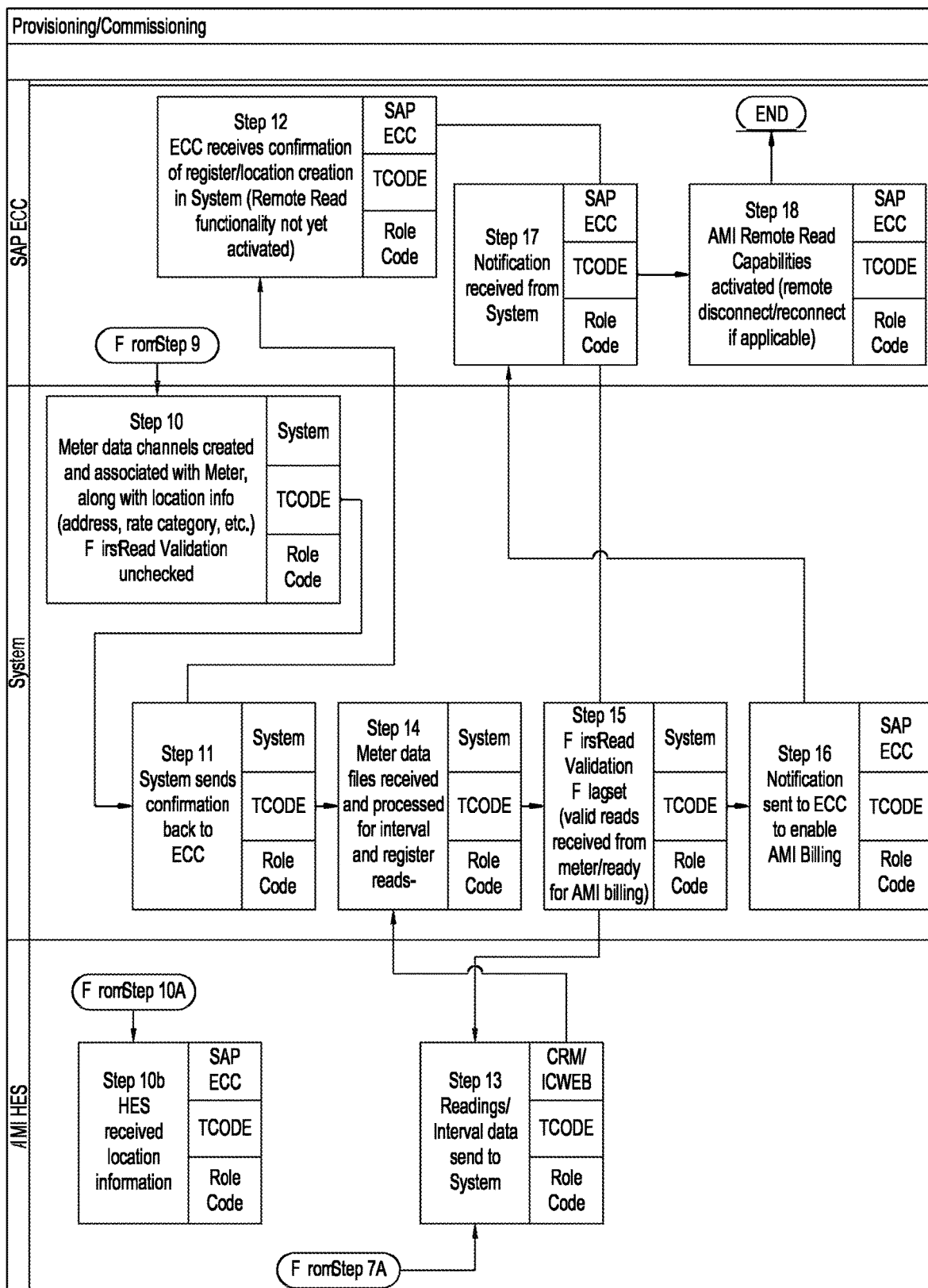

FIG. 5A and FIG. 5B show timing diagrams for meter installation. In FIGS. 5A and 5B, SAP is application services and system is the meter data management application. AMI HES is an HES. At Step 1 of FIG. 5A, meters are delivered to the utility with corresponding MMF and goods receipt files emailed to the utility. At Step 2, the meters are created in the application services. The system performs a manual step of loading the meter marriage file into the System at Step 2A. At Step 2B, the HES loads the meter marriage file into the HES system.

Returning to Step 2, at Step 3, the SAP sends basic asset master data to the System. The system creates, at Step 4, the asset master data in the meter database. The system then sends confirmation of the asset creation back to the application services at Step 5. At Step 6, application services receive confirmation for the system. At Step 7, the meters are physically installed in the field. When meters are physically installed, the HES begins receiving reads at Step 7A. At Step 8, a full install of the meter is performed. At Step 9, the location is sent, and channel information is registered to the System. At Step 10a, the system sends the location information to the HES.

The flow of FIG. 5A proceeds to FIG. 5B to Steps 10, 10B, and 13 respectively. Continuing with FIG. 5B, from Step 10A, the HES receives the location information in Step 10B. From Step 7A, the HES sends readings and interval data to the system in Step 13.

From Step 9, the system creates meter data channels and associates location information with the reads at Step 10. The system sends confirmation at Step 11 to the application services. The application services receive the confirmation of the register and location creation in the system at Step 12. At Step 17, the notification is received from the system. From Step 13 with the receipt of meter reads and interval data, the meter data files are received by the system and processed for interval and register reads at Step 14. At Step 15, the first read validation flag is set. At Step 16, notification is sent to the application services to enable AMI billing. At Step 17, notification is received from the system. At Step 18, the AMI remote read capabilities are activated.

Figure 6A:
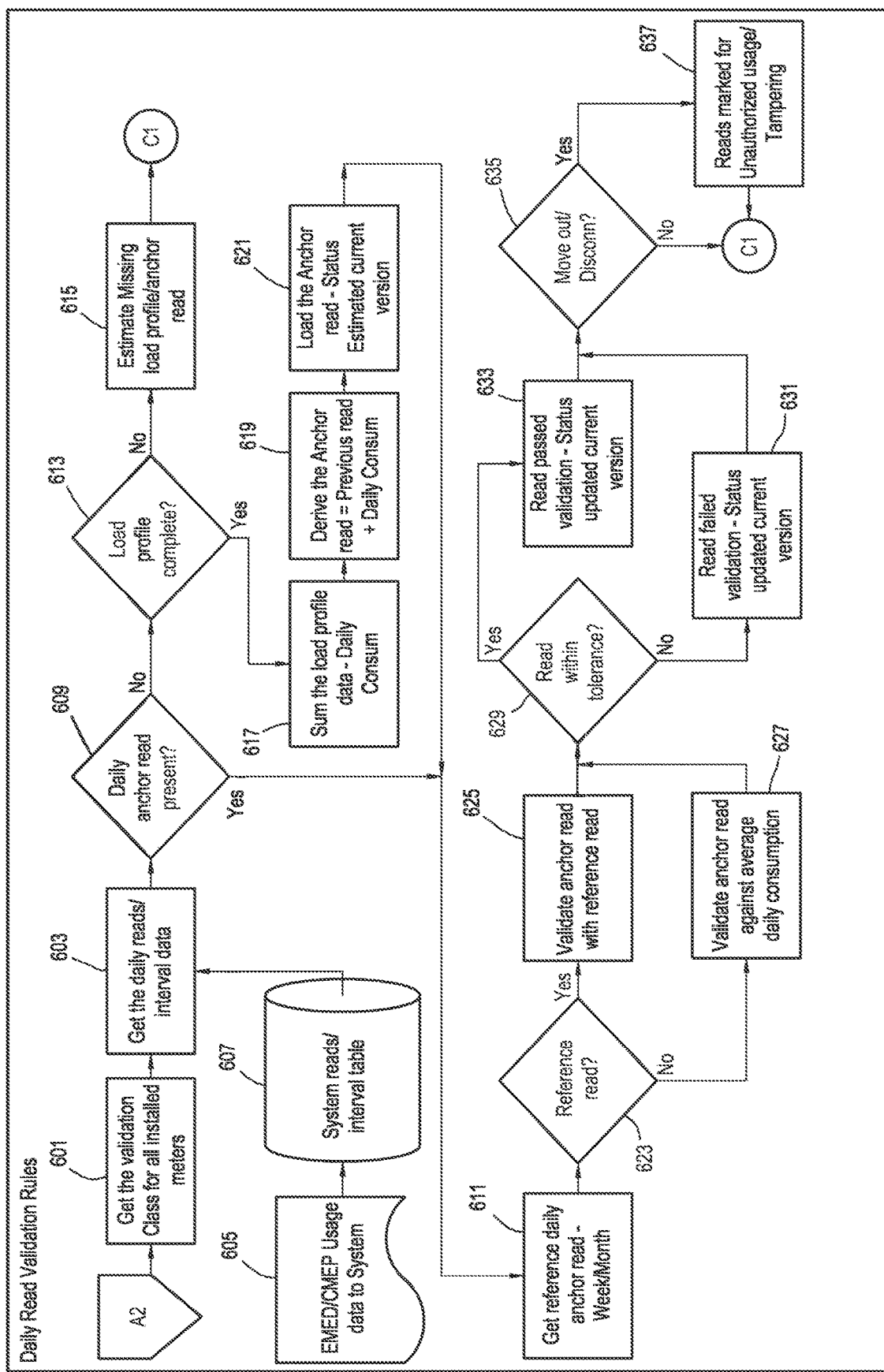
FIG. 6A, FIG. 6B, and FIG. 6C show diagrams of rules for validation in accordance with one or more embodiments.
Figure 6B:
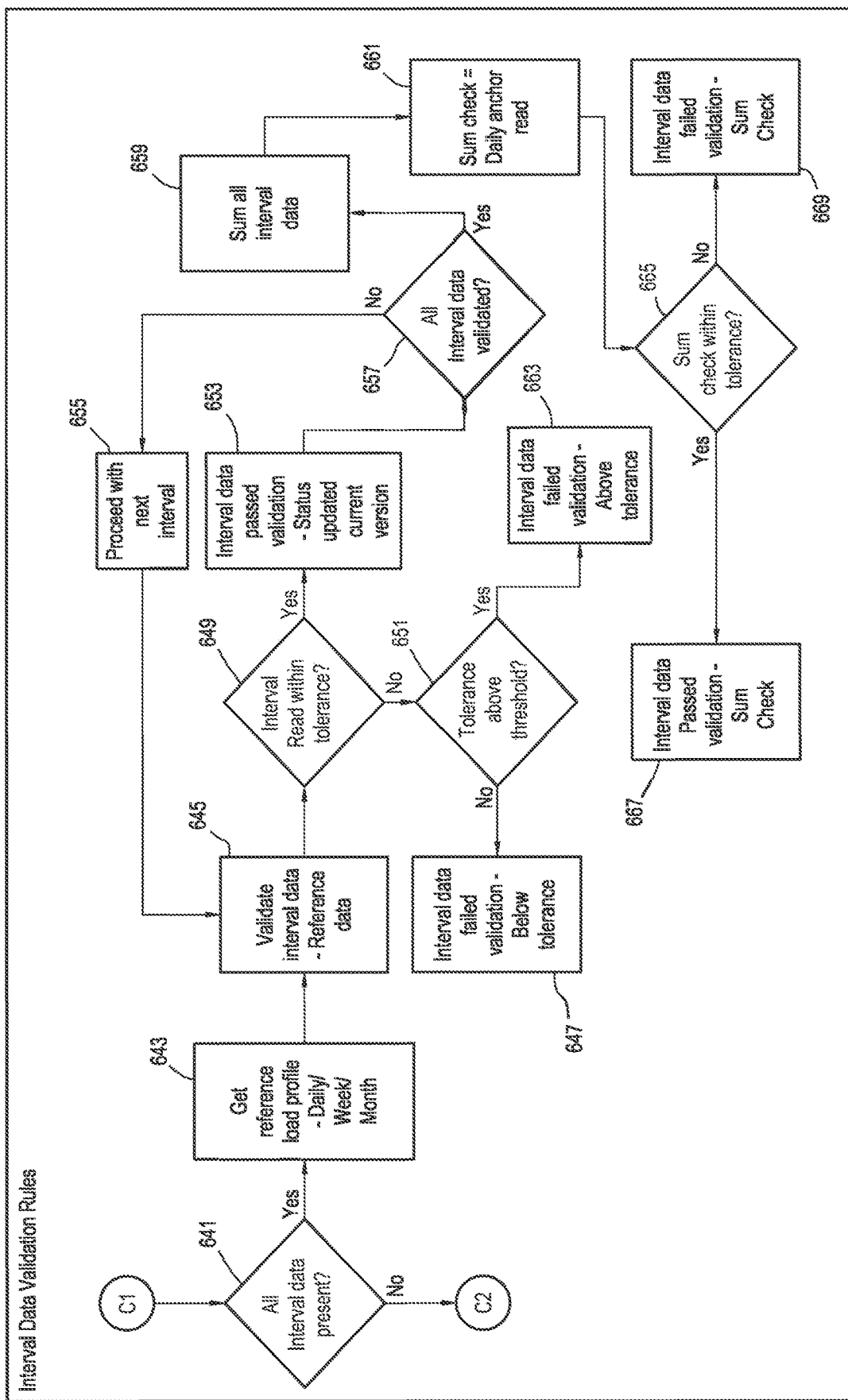
Figure 6C:
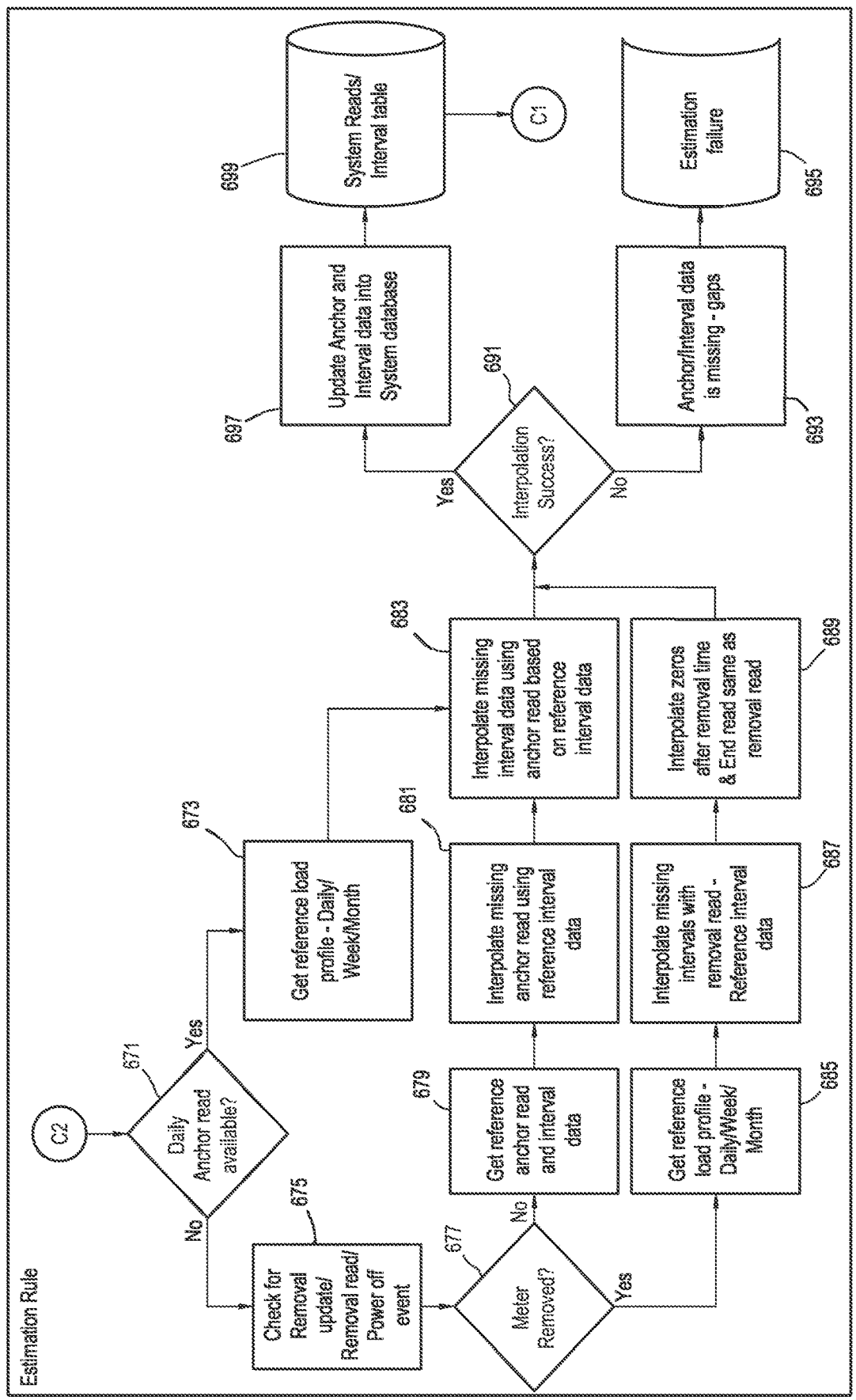

FIG. 6A, FIG. 6B, and FIG. 6C show a flowchart for read validation in accordance with one or more embodiments. The following is an overview of the validation and estimation system by the meter data management application. VEE design is documented considering the design features included in Validation, Estimation and Editing (VEE). VEE code is determined from the following parameters mentioned below: Individual meter Register, Meter program, and Rate category. In terms of the validation checks, the system (i.e., meter data management application) supports the assignment of different validation thresholds (as percentages/values) to different validation profiles. The utility can specify X consecutive intervals of bad reads before System raises an exception for user follow up. Configurators can also specify X consecutive days of missing reads/intervals before the application services initiates a service order for a field investigation. The System may also monitor for the following: Unauthorized usage (usage after move out and/or manual or remote disconnection); X (user definable per VEE profile) consecutive zero intervals; Missing reads; Power outage; "Roll over" check (current read lower than previous read); and Sum check validation between interval and register.

Further, users may specify replacement reads (whether through automatic estimation or manual manipulation) for saved or missing intervals and/or meter reads. The list of System estimation features includes the following: If the midnight read exists, System uses the midnight read to help estimate the missing interval data and vice versa. If the midnight read is missing and interval data is missing, System uses historical/reference interval data to estimate the missing interval data, and it uses both the current interval data (if present) as well as historical/reference interval data to help estimate the missing midnight read. Estimated interval data does not result in a peak demand/flow per interval. Specifically, the System will use, for each missing interval, an averaged consumption value. The System offers two methods for determining the reference period (method assignable in the composite VEE profile). The first estimation method is the use of midnight read to evenly estimate the missing reads. The second estimation method is the comparison of the targeted estimation date to the nearest reference date that belongs to the same date group (i.e. weekdays versus weekends). For example, estimating reads for a Wednesday will leverage reference reads from the week before (Wednesday) if available, two weeks before (Wednesday) if necessary, but not the Weekends prior. Similarly, for missing Sunday reads will leverage values of previous Sunday. If previous weeks/2 weeks' data is not available/estimated, we will use reference profiles, to estimate.

Continuing with System features for estimation, in terms of the reference time, System uses the matching time from the reference date (determined/described above). Further, the System supports the assignment of generic profiles (Reference Profile) to enable validation and estimation for brand new meter locations (i.e. new service). VEE methods are flexible and extensible on a project basis.

VEE is divided into two parts. The first is to register the meter VEE and the second is to interval the meter VEE. When the reads are uploaded from PO, the raw reads as version 1 without doing any validations. Later, the same reads are validated and updated as version 10 with read status. If new set of reads come from PO for same date and time stamp, we will update them as version 2.

If some reads required estimation, post estimation, the reads are saved as version 20 with updated read status. In case editing is required, the reads are updated with new version (Version 30) including updated read status. If the data is valid, a valid flagged ticked with each version exists.

UI editing may be performed. The GUI prompts the user for three actions: save with validation, estimate, or manually release the reads for billing. Saving with validation triggers re-validation of the read and will be saving the reads with S status after successful validation. Valid flag is also populated here. If the validation is a failure, update the reads with the failure reason code and valid flag is unticked. If user enters a read which is lesser than the future read, the future reads till the new read value is manually adjusted by the user.

Selection of estimate by the user causes estimation of the certain set of selected reads and save as version 30. If the user selects to manually release the reads, the user may select to have the reads released.

The following is the logic applied for Incoming Reads: Raw reads are saved with version 1; If reads come again for same date and time stamp, update as version 2; Validated version is saved as version 10; Estimated version is saved as version 20; and Edited version will be saved as version 30. The System read request fetches the latest version with valid flag populated (if no, the older version with a valid flag). The Valid flag will be flagged once for any of the 3 versions. After releasing for Billing, if a new set of reads come, the new read is parked with PAR status.

Turning to FIG. 6A, starting with A2, a validation class is obtained for installed meters in 601. Further, the daily meter reads and interval data are obtained in 603. As another example, EMED/CMEP usage data to the system is received in 605 along with the system reads and interval data in 607. In 609, a determination is made whether a daily anchor read is present. If a daily anchor read is present, the flow proceeds to 611 to get reference daily anchor read for the week and/or month. Returning to 609, if the daily anchor read is not present, the flow proceeds to 613 to determine whether the complete profile is loaded. If the complete profile is not loaded, the flow proceeds to estimate the missing load profile and anchor read in 615. If the load profile is complete, the flow proceeds to 617. In 617, the load profile data minus the daily consumption is summed. The anchor read is derived as the previous read added to the daily consumption in 619. The anchor read is loaded and the stated estimated as the current version in 621. The flow continues to 611, whereby the reference daily anchor read is obtained. In 623, a determination is made whether a reference read exists. If a reference read exists, the anchor read is validated against the reference read in 625. If a reference read does not exists, the anchor read is validated against the average daily consumption in 627. At 629, a determination is made whether a particular read being validated is within tolerance of the anchor read. If the read is not within tolerance, the read failed and the status for the read is updated in 631. If the read is within tolerance, the read passed, and the status is updated in 633. In 635, a determination is made whether the entity moved out or there is a disconnection at the meter. If the move out or disconnection occurred, then the read is marked for unauthorized usage or tampering in 637. After validating daily reads, the flow proceeds to FIG. 6B, element c1.

Turning to FIG. 6B, and starting at element C1, the flow proceeds to perform interval data validation. At 641, a determination is made whether the interval data is present. If interval data is not present, the flow proceeds to element C2 of FIG. 6C. If interval data is present, the flow continues with 643 in FIG. 6B. In 643, reference load profiles with daily, weekly, and monthly loads are obtained. In 645, the interval data is validated with reference data. In 649, a determination is made whether interval read is within a tolerance. If the read is not within tolerance, a determination is made whether the tolerance is above a threshold in 651. If the tolerance is not above a threshold, the interval data failed as being below tolerance in 647. If the tolerance is above threshold, the interval data failed as the validation is above tolerance in 663. Returning to 649, if the interval read is within the tolerance, the interval data passed. The status of the validation is updated in 653. A determination is made whether the interval data is validated in 657. If all interval data is not validated, the flow proceeds with the next interval in 655. If all interval data is validated, the flow proceeds to 659 to sum all of the interval data. In 661, a sum check is performed against the daily anchor read. In 665, a determination is made whether the sum check is within tolerance. If the sum check is not within tolerance, the interval data failed, and the validation is marked as such in 669. If the sum check is within tolerance, the interval data passed.

FIG. 6C shows a flowchart for applying an estimation rule to estimate meter reads. A determination is made at 671 whether daily anchor read is available. If a daily anchor read is available, then a reference load profile for daily/weekly/monthly is obtained in 673. If a daily anchor read is not available, then a check is performed for removal update, removal read, and/or a power off event in 675. A determination is made at 677 whether the meter is removed. If the meter is not removed, at 679 the reference anchor read and interval data is obtained. Further, at 681, the missing anchor read is interpolated using the reference interval data. The missing interval data is interpolated using the anchor read based on reference interval data at 683. If the meter is removed, a reference load profile for day, week, and/or month is obtained at 685. The missing intervals are interpolated with the removal read and used as a reference interval data at 687. The zeros are interpolated after the removal time and the end read is the same as the removal read at 689.

At 691, a determination is made whether the interpolation is a success. If the interpolation is not a success, the flow proceeds to 693, where a determination is made that the anchor/interval data is missing. Thus, the read is marked as estimation failure at 695. If the interpolation is a success, the flow proceeds to 697 to update the anchor and interval data into the meter database. The system reads and interval table are updated in 699.

Figure 7A:
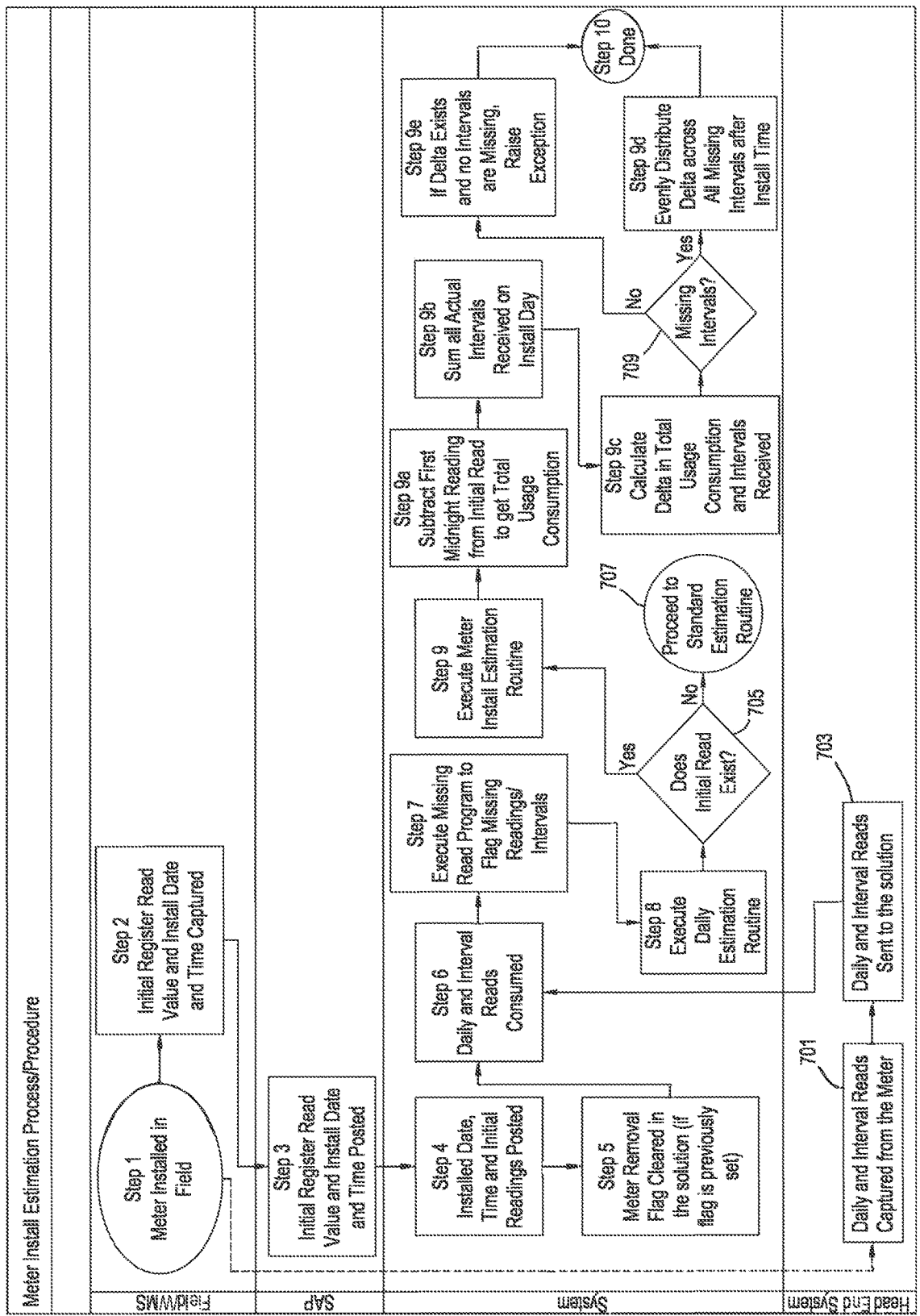
FIG. 7A and FIG. 7B show example diagrams of a meter install process in accordance with one or more embodiments.
Figure 7B:
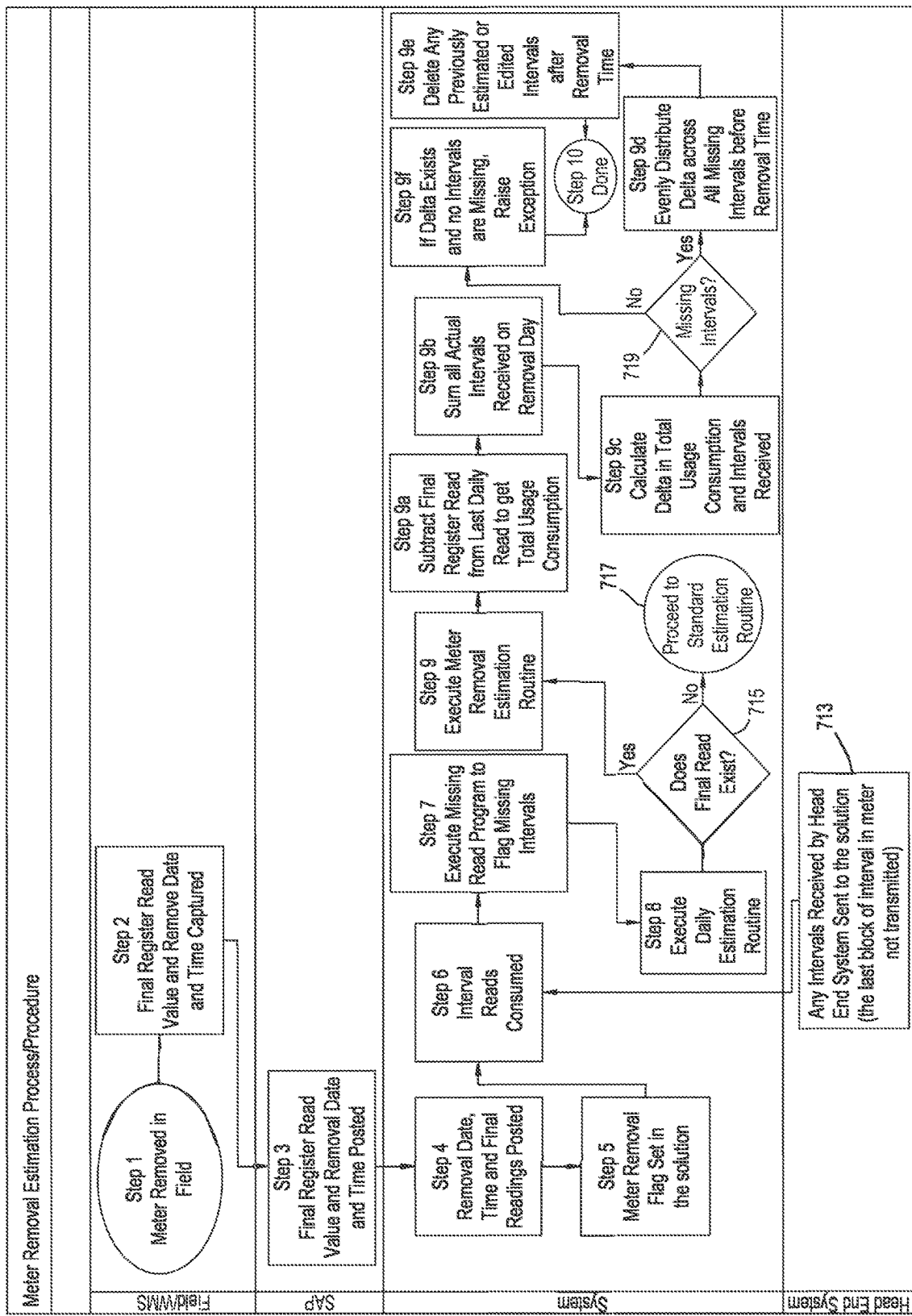

FIG. 7A and FIG. 7B show flowcharts for meter install estimation process. In Step 1, the meter is installed in the field. The SAP in FIGS. 7A and 7B is application services, while the system is the meter data management application. The initial register read value and the install date and time are captured in Step 2. When the meter is installed in the field, at 701, daily and interval reads are captured from the meter by the HES. Further, the HES sends the daily and interval reads to the meter management data application in 703. At Step 3, the application services receive an initial register read value, and an install date and time period is posted to the system.

At Step 4, the system posts the installed date, time, and initial reading posted. The meter removal flag is cleared in the meter data management application if previously set to show that the meter is a valid meter at Step 5. At Step 6, daily and interval reads are consumed from the HES via 703. At Step 7, missing read program is executed in order to flag missing reads/intervals. At Step 8, the daily estimation technique is executed. At determination is made at 705 whether an initial read exists. If an initial read does not exist, the flow proceeds to 707 to a standard estimation routine.

Returning to 705, if an initial read exists, the flow proceeds to Step 9 to execute the meter install estimation routine. In Step 9a, the first midnight reading is subtracted from the initial read to obtain the total usage consumption. In Step 9b actual intervals received on install day are summed. A delta in total usage consumption and intervals received are calculated at Step 9c. In 709, a determination is made whether missing intervals exist. In Step 9d, if missing intervals exist, then the delta is evenly distributed across the missing intervals after install time in Step 9d. If missing intervals do not exist, then if a delta exists to be that no intervals are missing, an exception is raised at 9e. The system completes for the current reading cycle at Step 10.

FIG. 7B shows an example of meter removal estimation process. At the field, the meter is removed in Step 1. The final register read value, and the removal date and time is captured in Step 2. In Step 3, the application services receive the final register read value, and the removal date and time period is posted. The flow proceeds to the system that posts, in Step 4, the removal date, time, and final readings. In Step 5, the meter removal flag is set in the meter data management application. The HES sends any intervals received to the system to the meter data management application in 713. In Step 6, the interval reads are consumed. In Step 7, the missing read program is executed, and any missing intervals are flagged. The daily estimation routine is executed in Step 8. A determination is made at 715 whether a final read exists. If a final read does not exist, the flow proceeds to a standard estimation routine in 717. If a final read does exist, the flow proceeds to Step 9 to execute the meter removal estimation routine. In Step 9a, the final register read is subtracted from the last daily read to obtain the total usage consumption. In Step 9b, the actual intervals received on removal day are summed. In Step 9c, the delta in total usage consumption and intervals received is calculated. A determination is made whether any missing intervals exist in Step 719. If missing intervals do exist, the delta is evenly distributed across all of the missing intervals after or before removal time. In Step 9e, any previously estimated or edited intervals are deleted after removal time. If missing intervals do not exist and if a delta exists to be no missing intervals, an exception is raised at Step 9f. In Step 10, the system completes the removal.

A problem exists in an unavailability of AMI data in the SAP CIS to support real-time or near-real-time operational analytics and the translation of the results into immediate relevant and timely actions. One or more embodiments combine the AMI metering data with the customer account data into one system for better analytics/troubleshooting of usage patterns, meter events, etc."

A problem exists in delays and exceptions within the billing process due to the unavailability of the AMI data within the SAP CIS. Current solution architectures create unnecessary hand-offs between the SAP CIS and MDM solutions that create wait steps and delays and increases exceptions. One or more embodiments reduce the complexity in the data model across the two applications and the orchestration of metering and billing processes between these different applications. The AMI data is accessible to SAP CIS to fulfill all billing requirements thereby reducing any delays/exceptions due to process and data handoffs."

A problem exists in that meter, location and register data tend to go out of sync between SAP and MDM, generating exceptions that cause failures in billing and customer service and an inability to support operational processes. (The constant complex synchronization of master data across the SAP CIS and MDM solutions is a necessity within the current/old architecture to facilitate the orchestration of AMI-driven business processes across the two solutions.) One or more embodiments resides internally within the SAP CIS to leverage the inherent master data and process data within SAP to support these processes; this eliminates the need for the master data synchronization and data sync exceptions occurring via the numerous interfaces between the two systems.

A problem exists in that failures in the orchestration of remote disconnections and reconnections (as well as other business processes) across the multiple systems can result in data inconsistency between SAP CIS and MDM impacting customer service operations. One or more embodiments reduces the complexity by eliminating the MDM middle layer and having SAP communicate directly with the HES in executing these processes. This eliminates the exceptions around the data inconsistency on connect/disconnect and other operational actions.

A problem exists in that duplication of business process exceptions occur between the SAP CIS and MDM systems and resolution of the duplicates across multiple systems creates inefficiencies in the utility's operations. One or more embodiments in the SAP CIS reduces the inefficiencies by eliminating the superfluous external MDM solution (and its unnecessary and duplicative exceptions). This reduces the duplication of exceptions around master data synchronization, billing, and operational data requests"

A problem exists in that system upgrades and maintenance to MDM requires additional testing efforts to validate integration, regression impact, and data consistency between the SAP CIS and MDMS. One or more embodiments resides internally within the SAP CIS to allow for the elimination of the separate MDMS; hence, it follows the invention reduces the complexity, duration, effort level, and overall total cost of ownership for the overall solution upgrade and maintenance cycle and minimizes the need for additional testing effort.

A problem exists in that data required by the external MDMS to manage operational and exception management work—location, rate, customer account, and process/transactional data is limited due to non-availability of the data in the MDMS and the lack of support for the delivery of that data via standard SAP interfaces. One or more embodiments resides within the SAP CIS system and allows users to perform that MDM work within SAP itself, leveraging the data already existing in SAP (including billing rates, account statuses, creditworthiness, etc.), pending work (existing service orders) more completely.

A problem exists in that the ability to profile data with right VEE services using advanced algorithms is limited in MDM due to non-availability of customer master and billing rate data through standard services. One or more embodiments resides internal within SAP CIS hence its advanced VEE engine can access customer and billing rate data near real time to determine the relevant VEE services applicable for the customer.

A problem exists in that traditional MDM does not support data model with virtual meters and complex billing requirements using standard MDUS services. One or more embodiments the data model is simplified as it leverages the SAP CIS data primarily and hence can support virtual metering requirements. Also, standard EDM engine may be housed within SAP CIS which can access the AMI data near real time and support complex billing requirements"

A problem exists in that standard MDUS integration with MDM encapsulates approximately 80 plus web services to be monitored and managed by SAP CIS to support master and transactional data. One or more embodiments eliminates the need for the standard MDUS services as it resides within SAP CIS. The interfaces are reduced by 90% to support meter provisioning and operational data requests with AMI system.

A problem exists in that customer, account and billing rate data are not supported using standard services, requires additional custom integration to support necessary operations. Additional custom integration can create complexity around master data sync resulting in exceptions. One or more embodiments completely eliminates the need for customer, account and billing data as it resides internal within SAP CIS.

A problem exists in that traditional MDUS integration requires sequencing of data interfaces by priority through middleware to ensure data synchronization and integrity between SAP and MDM. One or more embodiments does not require MDUS services due to simplifies data model and hence eliminates the need for any additional messaging requirements.

A problem exists in that master data corrections in SAP namely reversals of meter installation and removal on same day can cause data inconsistency in MDM resulting in sync exceptions. One or more embodiments resides internal within SAP CIS and access meter and location data near real time. This data model completely eliminates the data sync issues and corrections on a 3-tier architecture.

A problem exists in that delays in disconnect/connect confirmation from the AMI system can cause MDMS and SAP CIS to go out of sync which requires manual intervention to correct the data inconsistency. One or more embodiments leverages the standard disconnect/connect framework within SAP CIS and thus eliminates the typical sync issues due to disconnect/connect operations in a 3-tier model.

A problem exists in that no exception or alerts to SAP CIS upon failure to fulfill a read request due to missing read or VEE failure can lead to billing exceptions. One or more embodiments hosts the AMI data within SAP CIS and hence exceptions to fulfill a read request is managed internally to alert specific business group/operations for actions.

A problem exists in that changes to billed metered data in MDM or collection of actual read on an estimate read (gap reconciliation) requires additional exception handling procedures to implemented to notify SAP CIS to perform bill corrections. One or more embodiments host the AMI data within SAP CIS and hence changes to metered data can be managed internally to alert specific business group/operations for actions.

Figure 8A:
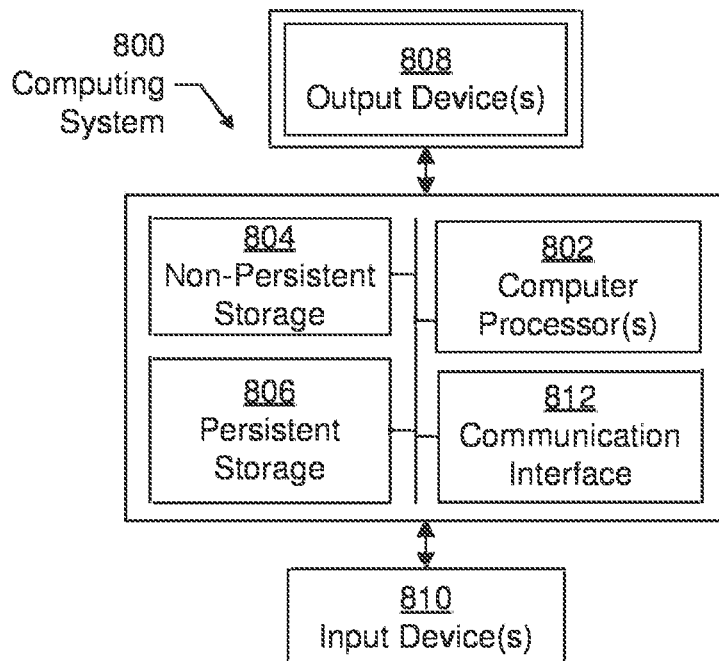
FIG. 8A and FIG. 8B show a computing system accordance with one or more embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) (802) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s) (810). The input and output device(s) (810 and 808) may be locally or remotely connected to the computer processor(s) (802), non-persistent storage (804), and persistent storage (806). Many different types of computing systems exist, and the aforementioned input and output device(s) (810 and 808) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
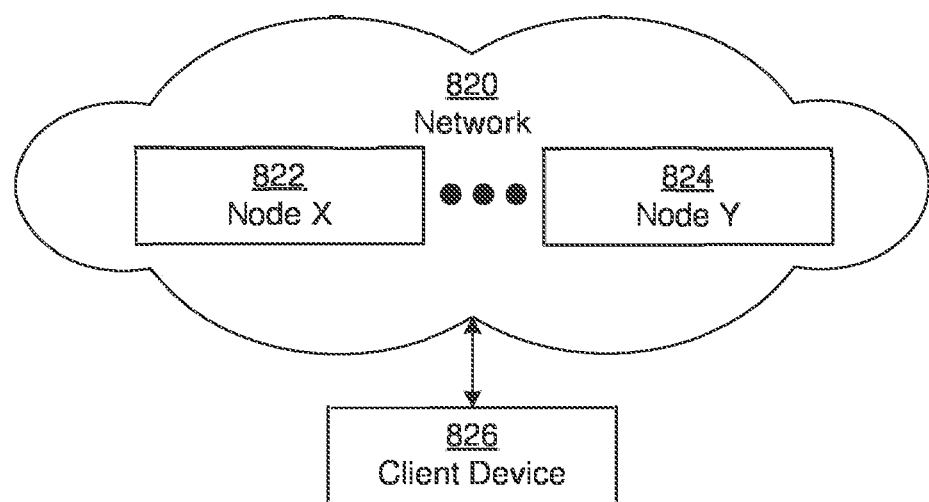

The computing system (800) in FIG. 8A may be connected to or be a part of a network. For example, as shown in FIG. 8B, the network (820) may include multiple nodes (e.g., node X (822), node Y (824)). Each node (822 and 824) may correspond to a computing system, such as the computing system (800) shown in FIG. 8A, or a group of nodes combined may correspond to the computing system (800) shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of one or more embodiments of the invention.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (800) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (800) of FIG. 8A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (800) in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (800) of FIG. 8A and the nodes (288 and 824) and/or client device (826) in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a central computer system and from a first head end system (HES), a first raw file comprising a first set of status events in a first HES specific format;
modifying the first set of status events in the first raw file by a first HES adapter on the central computer system to create a first unified formatted file, the first unified formatted file in a unified format, the first HES adapter connected to the first HES;
transforming, by a core HES adapter on the central computer system, the first unified formatted file to a first data management formatted file according to a data management format;
consuming, by the central computer system, the first data management formatted file;
receiving, by the central computer system executing a customer information system (CIS), a second raw file comprising a plurality of usage data;
storing, by the CIS, a raw version of the plurality of usage data in a meter database;
converting, by the CIS, the plurality of usage data to the data management format;
storing, by the CIS, in the meter database, the plurality of usage data in the data management format;
framing, by the CIS, the plurality of usage data in the data management format; and
billing, by the CIS, a utility's end customers using the plurality of usage data in the data management format based at least in part on the first set of status events.

2. The method of claim 1, further comprising:
deriving, by the CIS, an anchor read from a previous meter read and a daily consumption value, wherein a subset of the plurality of usage data are validated against the anchor read.

3. The method of claim 2, further comprising:
  validating, by the CIS, interval data of the subset of the plurality of usage data against a current read.

4. The method of claim 2, wherein validating the plurality of usage data comprises:
  detecting that a customer has a move out event in customer account data; and
  marking a meter read of the plurality of usage data as unauthorized in response to the move out event.

5. The method of claim 1, further comprising:
  detecting, by the CIS, a read that is an invalid read; and
  estimating, by the CIS, the invalid read based on customer account data.

6. The method of claim 1, further comprising:
  creating a billing order; and
  framing the plurality of usage data to generate a report.

7. The method of claim 1, further comprising:
  validating, by the CIS, the plurality of usage data using customer account data.

8. The method of claim 1, further comprising:
  detecting that interval data is not present;
  detecting a meter removal of a meter generating a meter read using customer account data; and
  interpolating a missing interval using a removal read based on the meter removal.

9. The method of claim 1, wherein the plurality of usage data is advanced metering infrastructure (AMI) metering data.

10. A system comprising:
  a meter database; and
  at least one computer processor comprising instructions for causing the at least one computer processor to perform operations, the operations comprising:
    receiving, by a central computer system and from a first head end system (HES), a first raw file comprising a first set of status events in a first HES specific format,
    modifying the first set of status events in the first raw file by a first HES adapter on the central computer system to create a first unified formatted file, the first unified formatted file in a unified format, the first HES adapter connected to the first HES,
    transforming, by a core HES adapter on the central computer system, the first unified formatted file to a first data management formatted file according to a data management format,
    consuming the first data management formatted file,
    receiving, by the central computer system executing a customer information system (CIS), a second raw file comprising a plurality of usage data,
    storing, by the CIS, a raw version of the plurality of usage data in the meter database,
    converting, by the CIS, the plurality of usage data to the data management format,
    storing, by the CIS, in the meter database, the plurality of usage data in the data management format,
    framing, by the CIS, the plurality of usage data in the data management format, and
    billing, by the CIS, a utility's end customers using the plurality of usage data in the data management format based at least in part on the first set of status events.

11. The system of claim 10, wherein the operations further comprise:
  validating, by the CIS, the plurality of usage data using customer account data.

12. The system of claim 11, wherein validating the plurality of usage data comprises:
  detecting that a customer has a move out event in customer account data; and
  marking a meter read of the plurality of usage data as unauthorized in response to the move out event.

13. The system of claim 10, wherein the operations further comprise:
  detecting, by the CIS, that interval data is not present;
  detecting, by the CIS, a meter removal of a meter generating a meter read using customer account data; and
  interpolating, by the CIS, a missing interval using a removal read based on the meter removal.

14. The system of claim 10, wherein the operations further comprise:
  detecting, by the CIS, a read that is an invalid read; and
  estimating, by the CIS, the invalid read based on customer account data.

15. The system of claim 10, wherein the operations further comprise:
  creating a billing order; and
  framing the plurality of usage data to generate a report.

16. The system of claim 10, wherein the operations further comprise:
  deriving, by the CIS, an anchor read from a previous meter read and a daily consumption value, wherein a subset of the plurality of usage data are validated against the anchor read.

17. The system of claim 16, wherein the operations further comprise:
  validating, by the CIS, interval data of the subset of the plurality of usage data against a current read.

18. A non-transitory computer readable medium comprising computer readable program code for causing at least one computer processor to perform operations comprising:
  receiving, by a central computer system and from a first head end system (HES), a first raw file comprising a first set of status events in a first HES specific format;
  modifying the first set of status events in the first raw file by a first HES adapter on the central computer system to create a first unified formatted file, the first unified formatted file in a unified format, the first HES adapter connected to the first HES;
  transforming, by a core HES adapter on the central computer system, the first unified formatted file to a first data management formatted file according to a data management format;
  consuming the first data management formatted file;
  receiving, by the central computer system executing a customer information system (CIS), a second raw file comprising a plurality of usage data;
  storing, by the CIS, a raw version of the plurality of usage data in a meter database;
  converting, by the CIS, the plurality of usage data to the data management format;
  storing, by the CIS, in the meter database, the plurality of usage data in the data management format;
  framing, by the CIS, the plurality of usage data in the data management format; and
  billing, by the CIS, a utility's end customers using the plurality of usage data in the data management format based at least in part on the first set of status events.

19. The non-transitory computer readable medium of claim 18, wherein the operations further comprise:
  validating, by the CIS, the plurality of usage data using customer account data.

20. The non-transitory computer readable medium of claim 18, wherein the operations further comprise:

detecting, by the CIS, that a customer has a move out event in customer account data; and marking, by the CIS, a meter read of the plurality of usage data as unauthorized in response to the move out event.

\* \* \* \* \*